United States Patent [19]

Schmidt

[11] 4,177,720

[45] Dec. 11, 1979

[54] PORTABLE GRILLING DEVICE

[75] Inventor: Klaus Schmidt, Ritterhude, Fed. Rep. of Germany

[73] Assignee: EWG Import u. Export GmbH & Co. Handelskommanditgesellschaft, Bremen, Fed. Rep. of Germany

[21] Appl. No.: 896,153

[22] Filed: Apr. 13, 1978

[30] Foreign Application Priority Data

Jan. 10, 1978 [DE] Fed. Rep. of Germany ....... 2800857

[51] Int. Cl.² .................... A47J 37/04; A47J 37/07
[52] U.S. Cl. .................... 99/419; 99/421 HV
[58] Field of Search .................... 99/421 R–421 V, 99/419, 420; 126/9 B

[56] References Cited

U.S. PATENT DOCUMENTS

| | | | |
|---|---|---|---|
| 2,379,239 | 6/1945 | Krebs | 99/421 HV |
| 2,477,529 | 7/1949 | Sprinkle et al. | 99/421 HV |
| 3,068,852 | 12/1962 | Purtzer | 99/421 H |
| 3,182,585 | 5/1965 | Rensch et al. | 99/421 H |

Primary Examiner—John M. Jillions
Attorney, Agent, or Firm—Wood, Herron & Evans

[57] ABSTRACT

A portable grill device of the type including a first bowl and a second bowl hingedly connected together. The bowls are movable between a closure position where the bowls overlie one another, a generally right angular use position where the second bowl is disposed substantially normal to the first bowl, and a generally horizontal use position where the first bowl and second bowl are fully opened. Novel leg bail structure is provided that offers three-legged support to both bowls when the bowls are in the horizontal use position, and that offers a support base substantially wider than the width of the first bowl when the second bowl is in the generally right angular use position relative to the first bowl. Further, the portable grill device includes novel latch structure which retains the two bowls in the generally right angular position, that latch structure cooperating with spit holder arms for restraining those spit holder arms in an elevated position over the first bowl.

9 Claims, 6 Drawing Figures

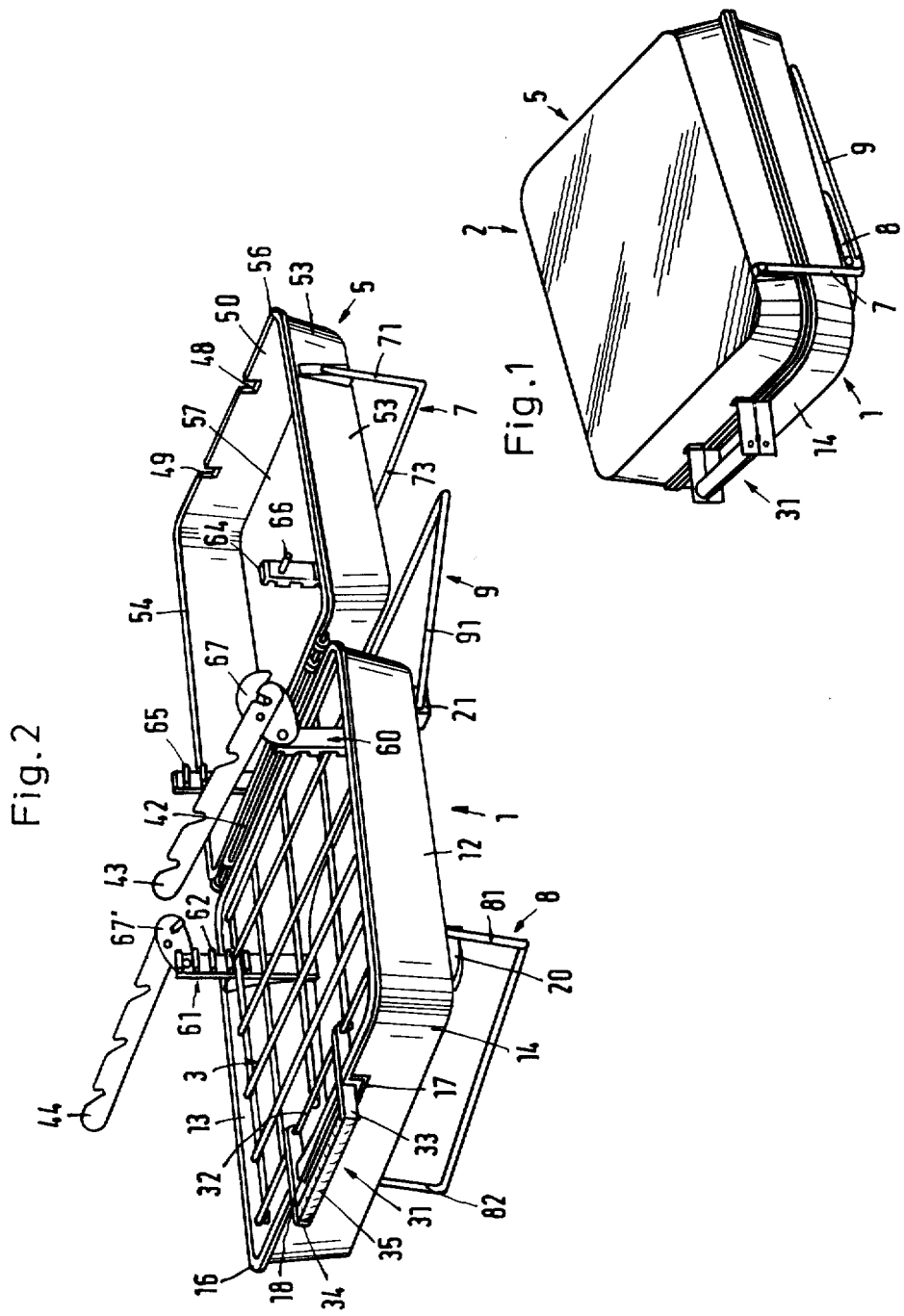

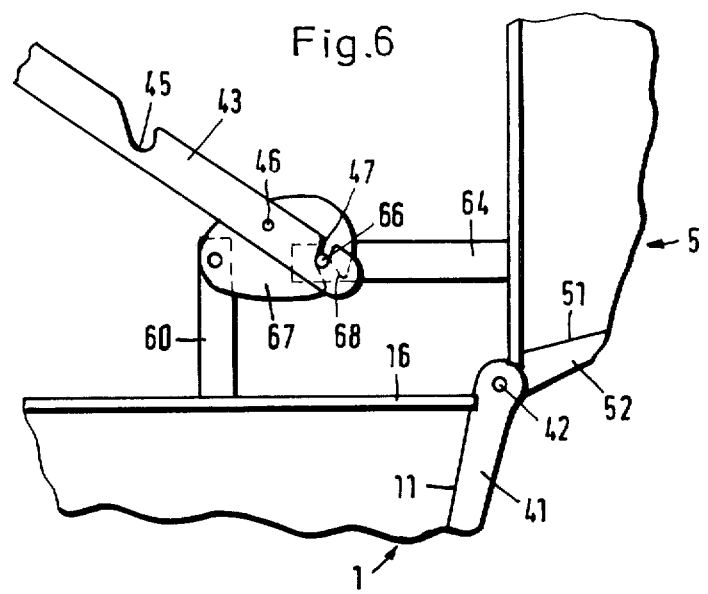
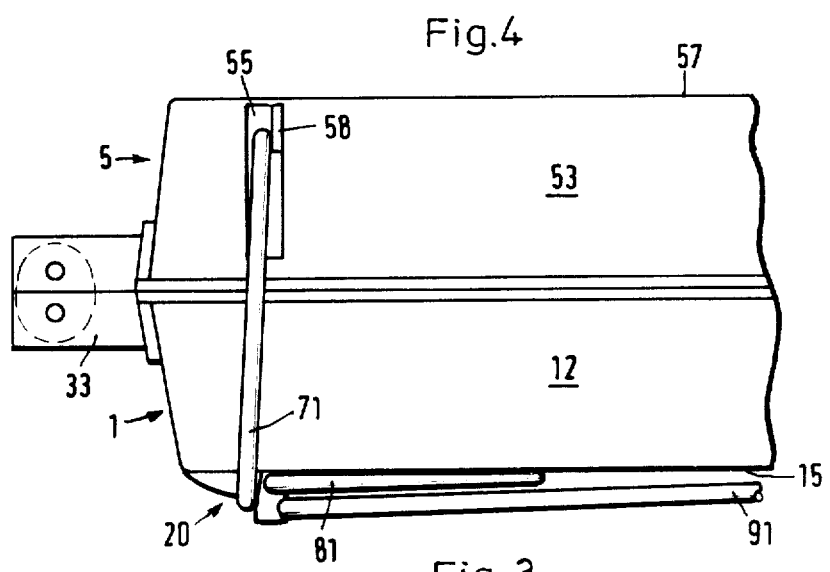
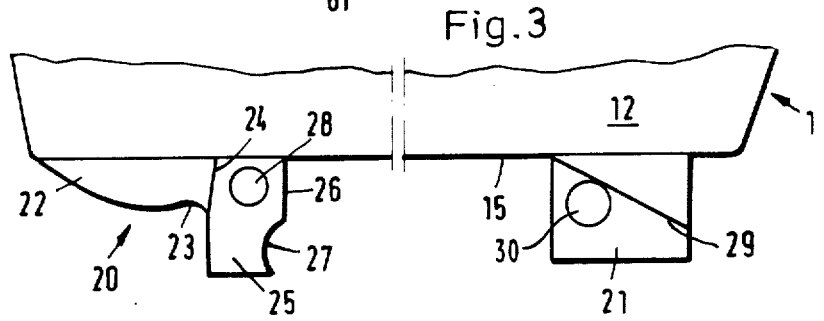

4,177,720

PORTABLE GRILLING DEVICE

This invention relates to grill devices. More particularly, this invention relates to portable grill devices.

Portable grill devices are, of course, very well known to the prior art. Such prior art portable grills are often used on camping trips for, in the open, it has been found desirable to grill, particularly, meat items for the pleasure and fun this type cooking presents. However, and with portable grill devices of the type known to the art, once the grill is broken down from its erected attitude into a transportation or storage attitude, it is common to place the parts of the grill in a larger container or carrying case for transporting the grill from one location to the next.

While a grill case holding the grill permits easy and clean transportation of the grill, it nevertheless requires much more space than the grill itself. Besides, the case interior often becomes soiled or dirty due to the inevitable ashes and grease residue, and perhaps even so dirty that use of the grill is no longer enjoyable. Therefore, and as a practical matter, oftentimes the grill remains fully erected, and is primarily used around the owner's home and garden.

The basic problem underlying this invention, therefore, is the desirability of a small grill that collapses into a unitary case that requires little space, yet that still permits unlimited grilling on a spit or on a grate.

Therefore, it is a primary objective of this invention to provide a portable grill device of the type having first and second grill bowls hingedly connected one to another, those grill bowls including novel leg bail means that function to support the two bowls in either a right angular use position or a horizontal use position, as well as function to restrain the two bowls in a closure position.

It has been another objective of this invention to provide an improved portable grill device of the type that includes first and second bowls hingedly connected one to another, that device including novel latch structure partially carried on each of the bowls that cooperates to restrain the bowls in a right angular use position, and that also functions to restrain at least one spit holder arm in an elevated position above the first bowl when the bowls are in the right angular use position.

In accord with the objectives of this invention, the improved portable grill device includes a first bowl, a second bowl hinged to the first bowl, and leg bails attached to the first and second bowls. In one preferred form, the leg bails hinged to the bottom of the first bowl are foldable into a storage position beneath the bottom of the first bowl, and the leg bail hinged to the bottom of the second bowl is foldable into a latching position with the first bowl, when the two bowls overlie one another in a closure position. This makes it possible to close the grill up into a tightly sealed one-piece case which is portable itself, and which will, with its folded legs, not require considerably more storage space than the two overlying bowls. In another preferred form, a carrying handle is attached to the front edge of a grate for the first bowl, the handle extending outwardly of the first bowl in all of its closure and use positions, thereby permitting easy carrying of the closed grill without touching the bowls, and also allowing repositioning or removal of the grate on the first bowl with hot coals in that bowl during use. In a further preferred form, the efficiency of the grill device can be increased by providing a grate for the second bowl, the second bowl being swingable on its hinge axis with the first bowl into a generally horizontal use position where the bowls' grates are substantially coplanar, the bowls being supported in that position by the leg bails. In still another preferred form, the grill device can support a spit at an elevated position above the first bowl on at least one spit holder arm that cooperates with a latch structure for locking the second bowl (with or without hot coals) in an essentially vertical position.

Further objectives and advantages of the invention will be apparent from the following detailed description, taken in conjunction with the attached drawings in which:

FIG. 1 is a perspective view of an improved portable grill device in accord with this invention, the grill being shown in a closure or storage position;

FIG. 2 is a perspective of the grill shown in FIG. 1, the grill being illustrated in the full open or generally horizontal use position;

FIG. 3 is an enlarged partial side view of a first bowl of the grill, the view showing leg holders for the grill's leg bails;

FIG. 4 is an enlarged partial side view of the front part of the grill in the closure position;

FIG. 6 is an enlarged partial side view of the latch structure shown in FIG. 5.

Figure 5:
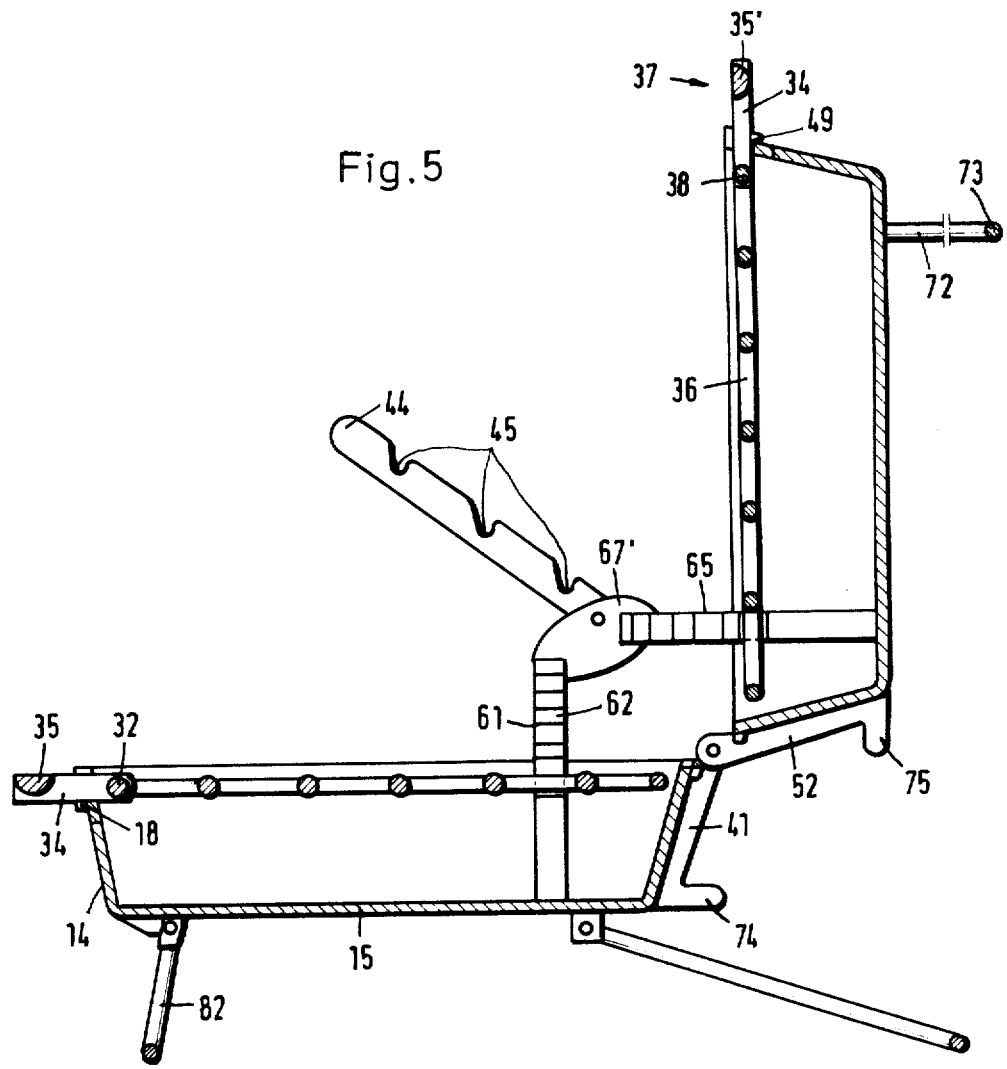
FIG. 5 is a partially broken away side view of the grill in the right angular use position, the second bowl being secured in the vertical position by the grill's latch structure.

The grill comprises a first coal bowl or box 1, and a top 5 which is fashioned as a second coal bowl or box. The first bowl 1 has the shape of an open-top essentially rectangular box with the back wall 11, left and right side walls 12, 13, and front wall 14, all tapering inward to the floor or bottom 15. A peripheral reinforcement rim 16, which interacts in essentially sealing fashion with the upper reinforcement rim 56 of top 5 through a tongue and groove type connection, is provided on the upper edge of the back wall 11, left side wall 12, front wall 14, right side wall 13 of the first bowl 1. The first bowl's front wall 14 features centrally symmetrical vertical slots 17, 18 that originate from the top edge, the significance of which will be described below.

A front leg bail 8 and a rear leg bail 9 are attached to the floor or bottom 15 of the first bowl 1, and a closing leg bail 7 is connected to side walls 53, 54 of the second bowl 5. A mounting block (of which the drawings show only the right, front mounting block 20 and the right, rear mounting block 21) is mounted to the bottom 15 of the first bowl 1 in the area of each of the four corners, see FIG. 3. The front mounting blocks 20 are of one identical design, and the rear mounting blocks 21 are of another identical design.

Each front mounting block 20 features a front stop section 22 which tapers toward the front while ending in its rear part in a slight flute 23. An outwardly extending flat stop surface 24 with a slight forward incline from the vertical is provided to stop the right shank 81 of the front leg bail 8 in a generally erect position when the grill is in use. The rear part 25 of the front mounting block 20 features, on the rearward pointing face 26, another flute 27 for receiving the rear leg bail 9. This additional flute 27 is recessed into the rear part 25 at a space which is somewhat larger than the thickness of the front leg bail 8. A hole 28 is bored between the flute 27 and the bottom 15, in the rear part 25, for receiving the rectangularly bent end of the front leg bail 8.

A diagonal lip 29 for the rear leg bail 9 is provided on the outer face of each rear mounting block 21, that lip 29 functioning as a stop shoulder that extends to the rear and down at a slant, see FIG. 3. The stop shoulder on lip 29 has an angle of inclination, relative to the bottom 15, such that the opened grill will be given a sufficiently large bearing face between erected leg bails 8 and 9 to guarantee stability even when the second bowl 5 is positioned essentially vertically, see FIG. 5. In this right angular position of the grill, and because of the length of the rear leg bail shank 91, the bearing point of the leg bail 9 against the support surface for the grill is positioned outboard of or beyond the upraised second bowls. A bore 30, which receives the rectangularly bent free end of the shank 91 of the rear leg bail 9, is provided in the outer face of the rear mounting block 21 in a recessed position underneath the stop 29.

Each side wall 53, 54 of the second bowl 5, mounts a shoulder 55 which includes a protrusion 58, see FIG. 4. The protrusion 58 functions as a rear stop for the closing leg bail 7 to maintain that leg bail 7 erect (and, hence, to support the second bowl 5) when the bowls are in the full open or generally horizontal use position shown in FIG. 1. A blind hole is provided below the protrusion 58, in the shoulder 55, for receiving the rectangularly bent end of the shank 71. Note the shoulder 55 is mounted adjacent to the second bowl's bottom 57 in a position generally above the first bowl's first mount block 20 when the bowls 1, 5 are in the overlying closure position shown in FIG. 4.

The rear wall 11 of the first bowl 1, near each of the side edges, also mounts a rib 41 of which only the right one is illustrated, see FIG. 5. The ribs 41 are bored through at the level of the reinforcement rim 16 to receive a hinge rod 42. Similarly for the second bowl 5, and on the rear wall 51 thereof near each of the side edges, two further ribs 52 are mounted of which only the right one is illustrated, see FIG. 5. The further ribs 52 are bored through under alignment at the level of the reinforcement rim 16 so that they can be received onto the hinge rod 42 too, thereby hingedly connecting the two bowls, one to the other. Feet 74, 75 which protrude rearward may be molded to the ribs 41, 52 to facilitate stowing of the closed grill 2.

To close the grill, the top or second bowl 5 is pivoted on the rod 42 into overlying placement on top of the first bowl 1. The U-shaped closing leg bail 7 is swung approximately 180° forward from its bowl supporting position illustrated in FIG. 5 to its locking position shown in FIGS. 1 and 4. As the leg bail 7 is so swung, its base section 73 will slide over the stop section 22 of blocks 20, and assume its final lower position by energizing in the flutes 23. The second bowl's upper reinforcement rim 56 then rests under sealing relation with the first bowl's lower reinforcement rim 16. Also, the U-shaped front leg bail 8 is folded against the first bowl's bottom 15 (the length of the shank 81 being shorter than the distance between the mounting blocks 20, 21), and thereafter U-shaped rear leg bail 9 is folded over the front leg bail 8 until it engages the flutes 27 of mounting block 20, thereby trapping the front leg bail between the first bowl's bottom and rear leg bail 9. In this state, the grill is closed into a storage position, the grill being portable while requiring a minimum of space.

A grate, consisting of the customary wire grid, is provided for each bowl 1, 5, the grates being identically structured. The first bowl's grate 3 includes a carrying handle 31 consisting of two webs 33, 34 that connect at one end with the grate as at 32, and at the other end with a heat-resistant, thermally insulated handle 35. The slots 17 and 18 in the first bowl's front wall 14 are just deep enough cut so that they snugly receive the webs 33, 34. The handle 31 extends beyond the periphery of the grill when the grill is closed so that the grill can be carried at the grip 35 without making contact with the coal bowls 1, 5. Posts 60, 61, each fashioned as a rack on its inside face, are mounted in the first bowl 1 in the rear area of the inside faces of the two side walls 12, 13 in a location adjacent the hinge pin 42, the posts protruding above the reinforcement rim 16. Depending upon the desired distance of the grate from the floor 15 of the first bowl 1, the removable and adjustable grate 3 is inserted either between the lower teeth or in the topmost tooth 62 of the rack posts 60, 61 by use of handle 35.

A second grate 36 is provided for the second bowl 5, the second grate being provided with another carrying handle 37 which is fashioned the same as the carrying handle 31. Holder strips 33 and 34 are attached to the front edge 38 of the additional grate, those strips extending beyond the front wall 50 of the second coal bowl 5 and holding between them a handle 35'. Slots 48, 49 are cut into the second bowl's front wall from the top edge, the strips 33, 34 extending through those slots when the grill is closed. Posts 64, 65 for the second grate 36 are attached adjacent the hinge pin 42 and the inside faces of side walls 54, 53 of the second bowl. These additional posts 64, 65 also rise above the upper reinforcement rim 56 of the second bowl 5, and also include an inside rack surface for receiving the second grate 36 at various levels above the floor 57 of the second bowl 5 as was the case with the first bowl 1.

Latch structure or means, partially carried by the first bowl 1 and partially carried by the second bowl 5, for releasably maintaining the bowls in the right angular use position shown in FIG. 5, and for allowing the bowls 1, 5 to open into the horizontal use position shown in FIG. 2, include the posts 60, 61, 64, 65. The latch means also includes a stud 66 attached to the outside face of each post 64, 65. The latch means further includes a hook 67, 67' mounted in swingable fashion to the outer face of each rack 60, 61, see FIGS. 5 and 6. As illustrated particularly in FIG. 6, the slotted throat 68 of each hook 67, 67' is adapted to trap a corresponding stud 66 on post 64 or 65 from above, thereby producing a detachable connection between posts 60, 61 of the first bowl 1 and posts 64, 65 of the second bowl. The studs 66 are positioned, and the hooks 67, 67' sized, so that the second bowl 5 is retained in a practically vertical position relative to the first bowl 1 when the latch means is so engaged. A safe stability of the grill is guaranteed when the second bowl 5 is raised due to the rear leg bail 9 reaching far to the rear and resting at a space behind the second bowl's bottom 57.

A spit holder arm 43 or 44 is hinged to each hook 67 adjacent one end, the freely extending long end of which presents upwardly directed spit slots 45 for receiving a spit (not shown) at a selectable level above the grate 3 of the first bowl 1. This hinged connection of arms 43, 44 with hook 67 is established at pivot point 46. Each arm 43, 44 includes a lock slot 47 (located on the other side of pivot point 46 from spit slots 45) for catching the outer end of stud 66 from below; the lock slot 47 is located at a distance from the pivot point 46 that equals the distance from the pivot point 46 of the inside end of the hook's throat 68. Each stud 66, therefore, also acts as an abutment for locating and supporting the related arm 43, 44 when the bowls 1, 5 are in the right angular use position shown in FIGS. 5 and 6. The upwardly directed lock slot 47 on each arm 43, 44 also functions to lock the hooks 67 on the studs 66 so that the second bowl 5 will be held safely in a vertical position, i.e., so that the second bowl cannot unintendedly drop from the vertical position forward onto the first bowl 1 or rearwardly to the support surface.

In the right angle use position, the pivot points 46 are selected in relation to the position of the studs 66 so that the holder arms 43, 44 will extend somewhat along the half-angle between the first 1 and second 5 bowls when in operating position. This makes it possible to evenly precook round meat items, e.g., ham or whole chickens, on the spit (not shown) both from the side and from below while at the same time browning it. Selectively possible as well, in this right angle use position, is a finish cooking or browning from only one side for round meat on the spit 60; in this case, flat meat items such as sausages or steaks can likewise be grilled with the aid of the elevated second bowl 5 on the grate 3 of the first bowl 1.

In the horizontal use position, the grilling area of the grill can be enlarged by releasing the second coal bowl 5 from its vertical position through use of the holder arms 43, 44 and hooks 67, and then orienting the second coal bowl 5 beside the first bowl 1, see FIG. 2. The second bowl 5 will then rest on the closing leg bail 7, which acts as a support in the grill's full open position, while orienting the grate 3, 36 in a coplanar attitude.

In order to obtain, in the fully unfolded state of the second bowl 5, an approximately level and almost continuous grate area consisting of grate 3 and the additional grate 36, the length of the shanks 71, 72 of the closing leg bail 7 equals essentially the length of the shanks 81, 82 of the front leg bail, and the inclination of the stop shoulder 29 for the rear leg bail 9 is so selected that the bowl's rims 16, 54 are coplanar and of equal distance above the grill's support surface.

When the grill fully unfolded, as shown in FIG. 2, additional pins or the like can be inserted for fixing the hooks 67, 67' with the holder arms 43, 44 in a desired elevated position, thereby making it possible, e.g., to grill over the first bowl 1 and to fry over the second bowl 5.

Having described in detail the preferred embodiment of my invention, what I desire to claim and protect by Letters Patent is:

1. A portable grill device comprising
   first and second bowls hingedly connected to move between an overlying closure position, a generally right angular use position, and a generally horizontal use position,
   latch means partially carried by said first bowl and partially carried by said second bowl for releasably maintaining said first and second bowls in said right angular use position and for allowing said first and second bowls to open into said generally horizontal use position, said latch means being positioned adjacent the hinge edge of each of said first and second bowls,
   at least one spit holder arm connected with said latch means, said spit holder arm and said latch means cooperating to locate said spit holder arm at an elevated position above said first bowl where said arm is directed toward that first bowl edge opposite to that first bowl's hinge edge, said cooperation being effected when said first and second bowls are in said right angular use position, and
   a spit located in supportive relation with said spit holder arm.

2. A portable grill device as set forth in claim 1, said latch means including
   at least one post fixed to said first bowl and extending upwardly from said first bowl to a height that does not prevent said second bowl from overlying said first bowl in the closure position,
   at least one post fixed to said second bowl and extending upwardly from said second bowl to a height that does not prevent said second bowl from overlying said first bowl in the closure position,
   a hook mounted on one of said posts, said hook including a slot, and
   a stud mounted to the other of said posts, said hook slot cooperating with said stud to maintain said bowls in the right angular use position.

3. A portable grill device as set forth in claim 2, said spit holder arm being pivotally connected to said hook, and said spit holder arm including
   a slot, said spit holder arm slot also cooperating with said stud to maintain said spit holder arm in said elevated position when said first and second bowls are in the right angular use position.

4. A portable grill device as set forth in claim 2, said device including
   a grate for said first bowl, said grate being supported at one edge by a side wall of said bowl opposite to that side wall which defines the hinge edge of said first bowl, and
   said post including
   at least one tooth for supporting the other edge of said grate in elevated relation above the floor of said bowl.

5. A portable grill device as set forth in claim 4, said device including
   a handle rigidly connected to said grate, said handle extending beyond the periphery of said first and second bowls when in the closure position to permit carrying of said grill device, said handle also extending beyond the periphery of said first bowl in both the right angular and horizontal use positions for allowing said grate to be removed or repositioned as desired by the user.

6. A portable grill device as set forth in claim 5, said device including
   a grate for said second bowl, said second bowl grate also having a handle rigidly connected thereto, said second bowl grate being structured to cooperate with said second bowl side wall edge opposite to that second bowl side wall edge which defines said hinge edge of said second bowl, and with said second bowl posts, in the same manner as said first bowl grate and handle structure cooperates with said first bowl.

7. A grill device comprising
   first and second bowls hingedly connected to move between an overlying closure position, a generally right angular use position, and a generally horizontal use position,
   at least one post fixed to said first bowl and extending upwardly from said first bowl to a height that does not prevent said second bowl from overlying said first bowl in the closure position, a hook mounted on said post, first restraint means for fixedly positioning said hook in a use position relative to said post when said first and second bowls are in a use position, at least one spit holder arm pivotally connected with said hook, and second restraint means for fixedly positioning said spit holder arm in a use position relative to said hook when said first and second bowls are in a use position, said spit holder arm being located at an elevated position above said first bowl in its use position.

8. A grill device as set forth in claim 7, said first restraint means including at least one post fixed to said second bowl and extending upwardly from said second bowl to a height that does not prevent said second bowl from overlying said first bowl in the closure position, a stud mounted to said last-named post fixed to said second bowl, said hook including a slot cooperating with said stud to maintain said bowls in the right angular use position.

9. A grill device as set forth in claim 8, said second restraint means including a slot defined in said spit holder arm, said spit holder arm slot also cooperating with said stud to maintain said spit holder arm in said elevated position when said first and second bowls are in the right angular use position.

* * * * *